United States Patent
Dixon

[19]

[11] Patent Number: 5,940,290
[45] Date of Patent: Aug. 17, 1999

[54] METHOD OF PREDICTIVE MAINTENANCE OF A PROCESS CONTROL SYSTEM HAVING FLUID MOVEMENT

[75] Inventor: Glenn W. Dixon, Montgomery County, Pa.

[73] Assignee: Honeywell Inc., Minneapolis, Minn.

[21] Appl. No.: 08/712,766

[22] Filed: Sep. 12, 1996

[30] Foreign Application Priority Data

Dec. 6, 1995 [WO] WIPO ............... PCT/US95/15839

[51] Int. Cl.$^6$ ............................. G05B 15/02
[52] U.S. Cl. ............... 364/138; 364/510; 364/474.11
[58] Field of Search ............... 364/130, 138–139, 364/474.11, 500, 510, 551.01, 558, 556, 149, 150, 184, 185, 186, 187, 131; 340/611; 702/12

[56] References Cited

U.S. PATENT DOCUMENTS

| | | | |
|---|---|---|---|
| 3,594,557 | 7/1971 | Anderson | 364/177 |
| 4,361,030 | 11/1982 | Heide | 73/40.5 R |
| 5,272,646 | 12/1993 | Farmer | 364/509 |

*Primary Examiner*—Albert DeCady
*Assistant Examiner*—Shelly A Chase
*Attorney, Agent, or Firm*—Anthony Miologos; Arthur A. Sapelli

[57] ABSTRACT

A pipeline system of a process facility has a plurality of equipments, the equipments including at least one pipeline for providing a channel for a fluid of a process to flow. The process of the process facility is controlled by a process control system. The equipments also include at least one device for measuring a process variable of the fluid. The device comprises a sensor element for sensing a predetermined process variable of the fluid flowing in the pipeline to output a signal containing information about the process variable being measured and containing information about the fluid flowing in the pipeline. The device further includes a first filter to pass a first component of the signal containing the information of the process variable and a second filter to pass a second component of the signal containing the information about the fluid flowing in the pipeline. A first processor processes the first component of the signal to output the process variable to the process control system to control the process. A second processor processes the second component of the signal in a flow model of the pipeline system to output advisory information indicating imminent failure of the equipment when detected by said processing by the second processor.

6 Claims, 8 Drawing Sheets

METHOD OF PREDICTIVE MAINTENANCE OF A PROCESS CONTROL SYSTEM HAVING FLUID MOVEMENT

BACKGROUND OF THE INVENTION

The present invention relates to a process control system, and more particularly, to a method of predictive maintenance of a process control system having fluid movement in a pipeline and, further, having instrumentation devices for measuring parameters (or process variables) of the fluid.

In present systems, pressure, or differential pressure, of a fluid is measured as it moves (flows) through a pipeline. Further, in present day systems, a large amount of effort is used to eliminate the "flow noise" of the fluid as it flows through a pipeline (or more simply pipe). Fluid noise is inherent in almost any fluid as it flows through a pipeline. The noise is generally a random, low frequency noise and has always been a prime consideration in the designs of the pressure devices, flow meter devices, . . . and like devices. Specifically, flow noise is an undesirable component of fluid flow in a pipeline and is sought to be eliminated. If a noise signal which results from the fluid noise is permitted to propagate through the devices attempting to measure parameters of the fluid flowing in the pipeline, then, for example, a device measuring pressure will measure pressure plus all the deviations of pressure of the fluid caused by the noise signal component. It is highly undesirable to measure a process variable which fluctuates based on the noise which is being detected in the pipeline. Thus, efforts are made to eliminate the noise component of a signal outputted from the measuring device utilizing well-known techniques. The result is a quiet, stable measurement of the pressure (as an example).

The present invention utilizes the noise signal, which has previously been separated and discarded, and analyzes the noise signal to extract data from the noise. Inherent in the noise is information about the flow, such as a popped bearing failure, a leak in the pipe, a pump cavitation, . . . . The present invention thereby provides an improvement over current and past systems by providing a method of predictive maintenance of a process system having fluids flowing in a pipeline and utilizing devices for measuring process variables (or parameters) of the control system.

SUMMARY OF THE INVENTION

Therefore, there is provided by the present invention, a method of predictive maintenance of a process having fluid movement therein. The device further includes a first filter to pass a first component of the signal containing the information of the process variable, and a second filter to pass a second component of the signal containing the information about the fluid flowing in the pipeline. A first processor processes the first component of the signal to output the process variable to the process control system to control the process. A second processor processes the second component of the signal in a flow model of the pipeline system to output advisory information indicating imminent failure of the equipment when detected by said processing by the second processor. A pipeline system of a process facility has a plurality of equipments, the equipments including at least one pipeline for providing a channel for a fluid of a process to flow. The process of the process facility is controlled by a process control system. The equipments also include at least one device for measuring a process variable of the fluid. The device comprises a sensor element for sensing a predetermined process variable of the fluid flowing in the pipeline to output a signal containing information about the process variable being measured and containing information about the fluid flowing in the pipeline.

Accordingly, it is an object of the present invention to provide a method of predictive maintenance.

It is another object of the present invention to provide a method of predictive maintenance of a process control system having fluid movement therein.

It is still another object of the present invention to provide a method of predictive maintenance of a process control system having fluid movement in a pipeline.

It is yet another object of the present invention to provide a method of predictive maintenance control of a process control system having fluid flowing in a pipeline and further including devices for measuring the process variables of the fluid contained therein.

These and other objects of the present invention will become more apparent when taken in conjunction with the following description and attached drawings, wherein like characters indicate like parts, and which drawings form a part of the present application.

DETAILED DESCRIPTION

Figure 1:
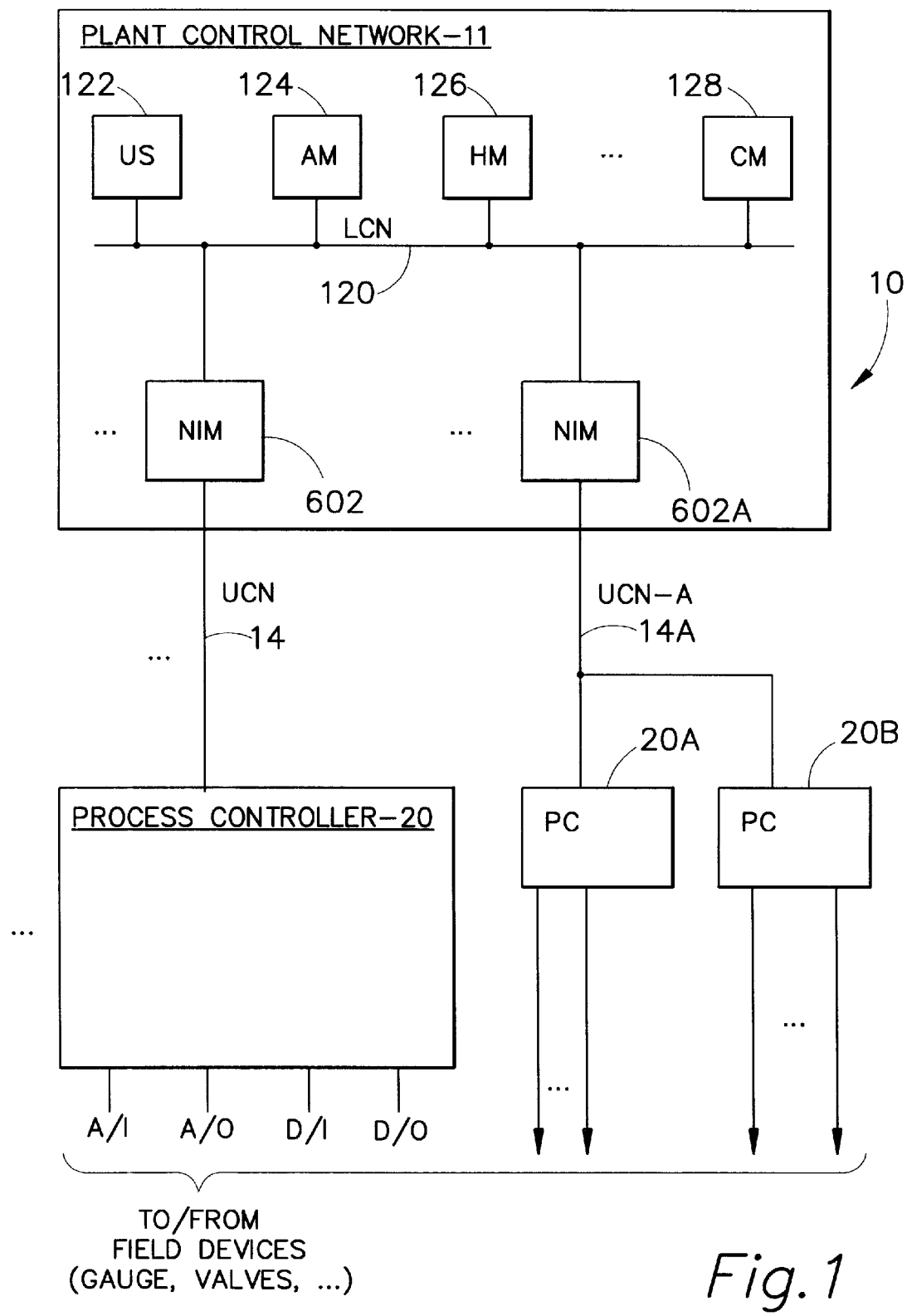
FIG. 1 shows a block diagram of a process control system in which the present invention can be utilized.
Figure 2:
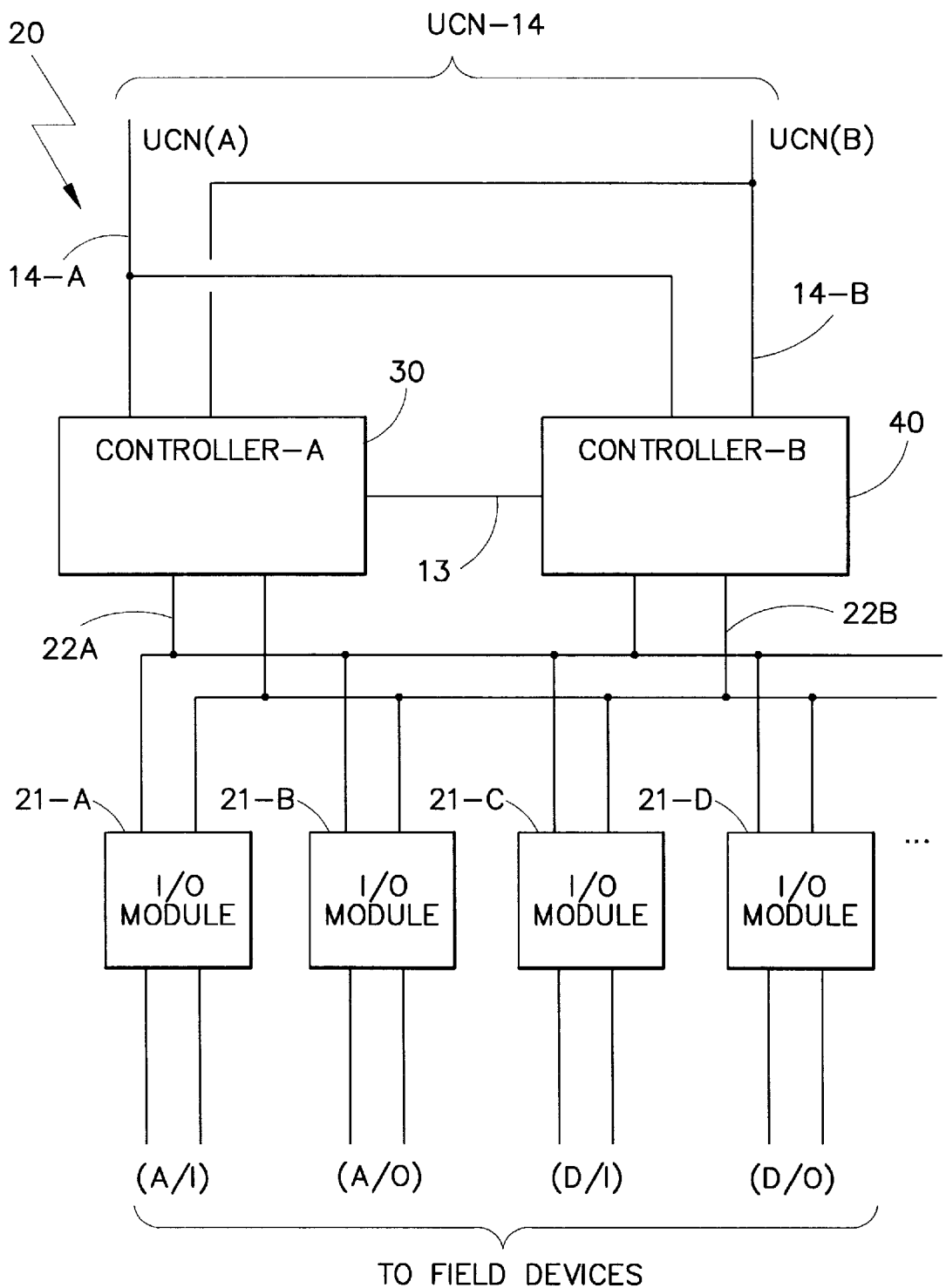
FIG. 2 shows a block diagram of a process controller, including I/O modules (IOP), in which the present invention can be utilized.

Before describing the method of the present invention, it will be helpful in understanding a system environment in which the present invention can be utilized. Referring to FIGS. 1 and 2, there is shown a block diagram of a process control system 10 in which the present invention can be utilized.

The individual layers of the process control systems include input processor devices (OP 21, sometimes referred to as I/O module) used to interface with field devices, a controller 30, 40, (input processor devices 21 and the controller 30, 40 make up a process controller 20), a network interface (NIM 602) allowing a network of process controllers 20 to be interfaced to a local area network (plant control network 11) which includes man/machine interface devices (US 122) and a historization device (HM 126). The process control system 10 allows for any of these interposing devices to be made redundant for the critical needs of a process control to ensure that information from the field devices is not lost.

The structure of the process control system 10 will now be described. Referring to FIG. 1, there is shown a block diagram of the process control system of the preferred embodiment. The process control system 10 includes a plant control network 11, in which a process controller 20 is operatively connected to the plant control network 11 via a universal control network (UCN) 14 to a network interface module (NIM) 602. In the preferred embodiment of the process control system 10, additional process controllers 20 can be operatively connected to the plant control network 11 via additional corresponding NIMs 602. The process controller 20 interfaces analog input and output signals and digital input and output signals (A/I, A/O, D/I, and D/O, respectively) to the process control system 10 from the variety of field devices (not shown) which include, pumps, motors, valves, pressure switches, pressure gauges, thermocouples, . . . . Inputs also include relay closures and the like indicative of the occurrence of a predefined event.

The plant control network 11 provides the overall supervision of a controlled process, in conjunction with the plant operator, and obtains all the information needed to perform the supervisory function and includes an interface with the operator. The plant control network 11 includes a plurality of physical modules, which include a universal operator station (US) 122, an application module (AM) 124, a history module (HM) 126, a computer module (CM) 128, and duplicates of these modules (and additional types of modules, not shown) as necessary to perform the required control/supervisory function of the process being controlled. Each of these physical modules is operatively connected to a local control network (LCN) 120 which permits each of these modules to communicate with each other as necessary. The NIM 602 provides an interface between the LCN 120 and the UCN 14. A more complete description of the plant control network 11, and the physical modules can be had by reference to U.S. Pat. No. 4,607,256.

Referring to FIG. 2 there is shown a block diagram of the process controller 20. The preferred embodiment of the process controller 20 of the preferred embodiment of the process control system 10 includes a controller A 30 and a controller B 40, which effectively operate as a primary and a secondary controller. Controller A 30 and controller B 40 are connected to the UCN 14, the UCN 14 in the preferred embodiment, comprising for communication redundancy purposes a UCN(A) 14A and a UCN(B) 14B. Input/output processors (IOPs) (sometimes referred to herein as input output [I/O] modules) 21 interface to field devices, field devices being various pumps, motors, valves, pressure switches, pressure gauges, thermocouples, . . . which can be analog inputs (A/I), analog outputs (A/O), digital inputs (D/I), and digital outputs (D/O). The controller A 30 and controller B 40 interface to one or more I/O modules via a BUS 22, the BUS 22 in the preferred embodiment, communicating via a redundant BUS 22A and a BUS 22B. A more complete description of process controller 20, which includes controller 30 and IOP 21, can be had by reference to U.S. Pat. No. 5,146,401.

Figure 3:
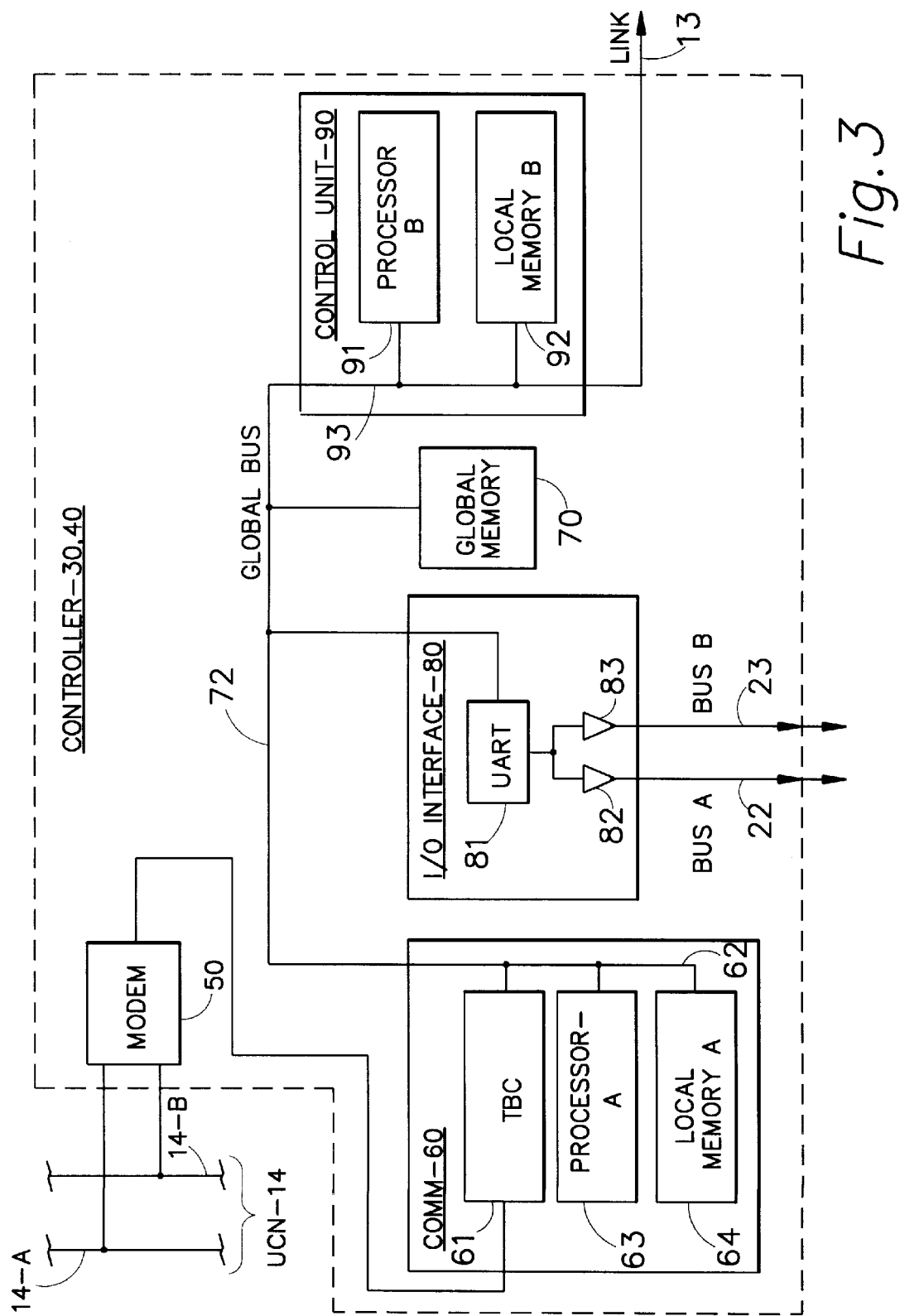
FIG. 3 shows a block diagram of a controller which is included in the process controller of FIG. 2.

Referring to FIG. 3, there is shown a block diagram of the controller 30, 40. A modem 50 is connected to the UCN 14, the modem having two inputs, one connected to UCN 14A and the other connected UCN 14B. The modem 50 interfaces with a communication unit (COMM) 60 which in turn interfaces with a global memory 70, an I/O interface unit 80, and a control unit 90 via global BUS 72. A processor A 63 communicates with the plant control network 11 via modem 50 and TBC 61. The global memory 70 also serves as an interprocessor communication vehicle between the processors A 63 and B 91. Control unit 90 includes the processor B 91 and a local memory B 92, both connected to a local BUS 93. Processor B 91 performs the control function (i.e., control processing) relating to the field devices.

The I/O interface unit 80 includes a receiver-transmitter device, this device being a UART (Universal Asynchronous Receiver/Transmitter) 81. The UART 81 is coupled through drivers 82, 83 to BUS 22A and BUS 22B, respectively.

Processor B 91 receives data from the various field devices through global memory 70, performs the necessary point processing and control function, and then updates the local memory B 92 and global memory 70, as required. The communication unit 60, in response to commands from the control unit 90 via global memory 70, inputs and outputs data between the I/O modules 21 (via the I/O interface unit 80) and the global memory 70, thereby relieving the control unit 90 from the burden of I/O module management. In this manner the control processing is performed by the control unit 90 within the process controller 20 for the predefined attached field devices, and the communication (i.e., the I/O control) is handled by the communication unit 60 through the UART 81.

Figure 4:
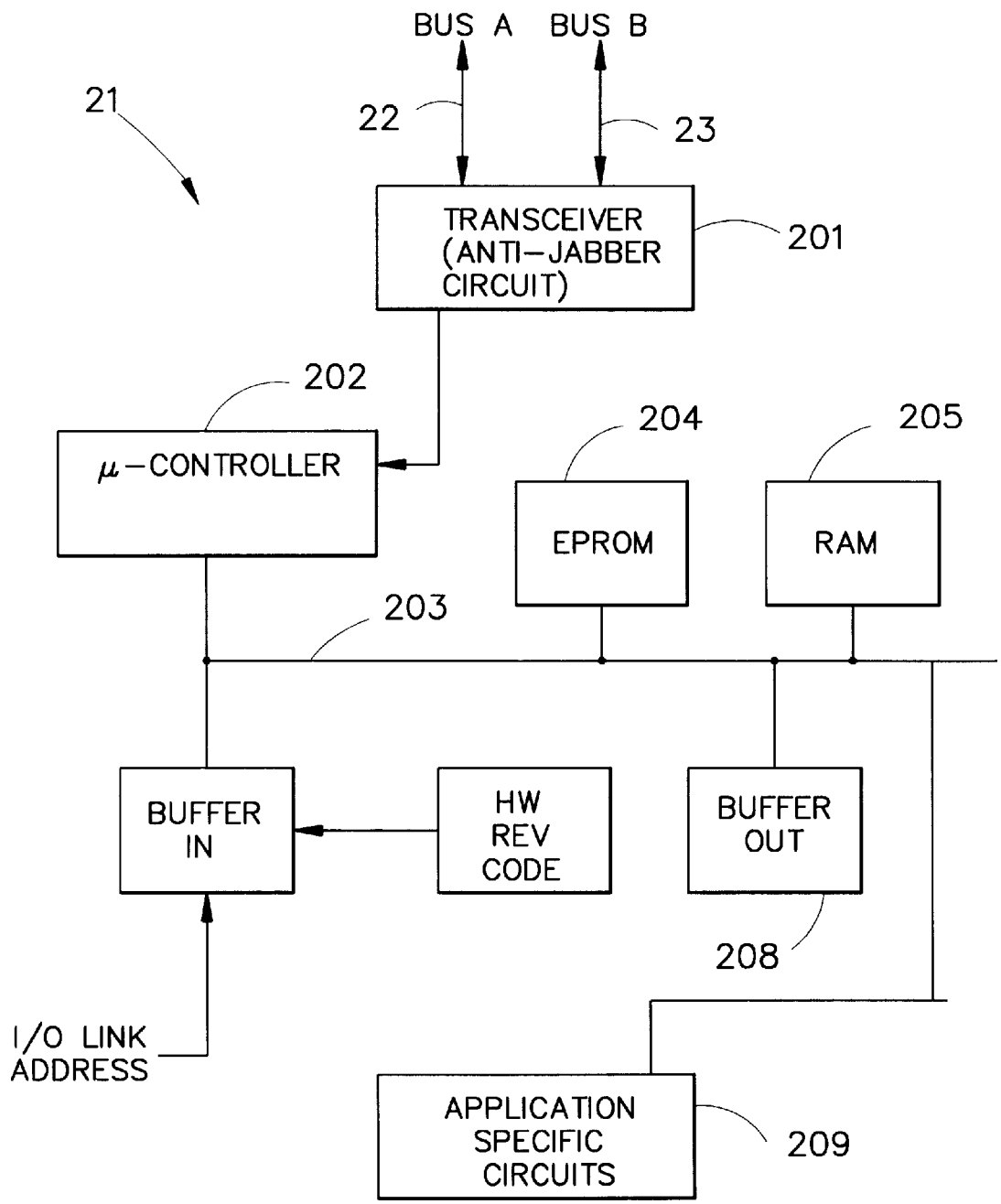
FIG. 4 shows a block diagram of an I/O module which is included in the process controller of FIG. 2.

Referring to FIG. 4 there is shown a partial block diagram of an I/O module of the components of interest. A transceiver (anti-jabber circuit) 201 interfaces with BUS 22A and BUS 22B. The transceiver 201 interfaces with a microcontroller (u-controller) 202 which, in the preferred embodiment, is of the type Intel 80C31. The microcontroller is coupled to a local BUS 203, and includes an EPROM 204 and a RAM 205 also connected to the local BUS 203. The RAM 205 contains the information which forms the database for the I/O module 21. The EPROM 204 contains the program information utilized by the microcontroller 202. The application-specific circuits 209 are also connected to the local BUS 203 and the microcontroller 202 via the local BUS 203. The application-specific circuits 209 vary from I/O module to I/O module depending on the field device to which the I/O module is to be coupled. If the field device is of a type which requires a digital input, then the application-specific circuit 209 will include the logic in order to place the digital input into a predefined format which will interface with the remainder of the I/O module. Likewise, if the field device is such that requires an analog input, then the application-specific circuit contains logic which converts the analog input signal (via an A/D converter) into a format again consistent with predefined formats. In this manner, the I/O modules are referred to as a specific I/O module type. The microcontroller 202 performs the I/O processing (or preprocessing) for the application specific circuits 209. The preprocessing will vary from each I/O module 21 depending on the type (i.e., A/I, A/O, . . . ), the preprocessing essentially consisting of translating the signals from the application-specific circuits to a format compatible with the controller 30, 40 and putting the signals from controller 30, 40 in a format compatible with the I/O module 21. Some of the preprocessing performed includes zero drift, linearization (linearizing thermocouples), hardware correction, compensation (gain compensation and zero compensation), reference junction compensation, calibration correction, conversions, checking for alarms (limits) . . . and generating a signal in a predetermined format having predetermined scale (i.e., engineering units, normalized units, percent of scale, . . . ). In the preferred embodiment seven types of applications-specific circuits are provided for. These include a high-level analog input, low-level analog input, analog output, digital input, digital output, smart transmitter interface, and pulse input counter.

Figure 5:
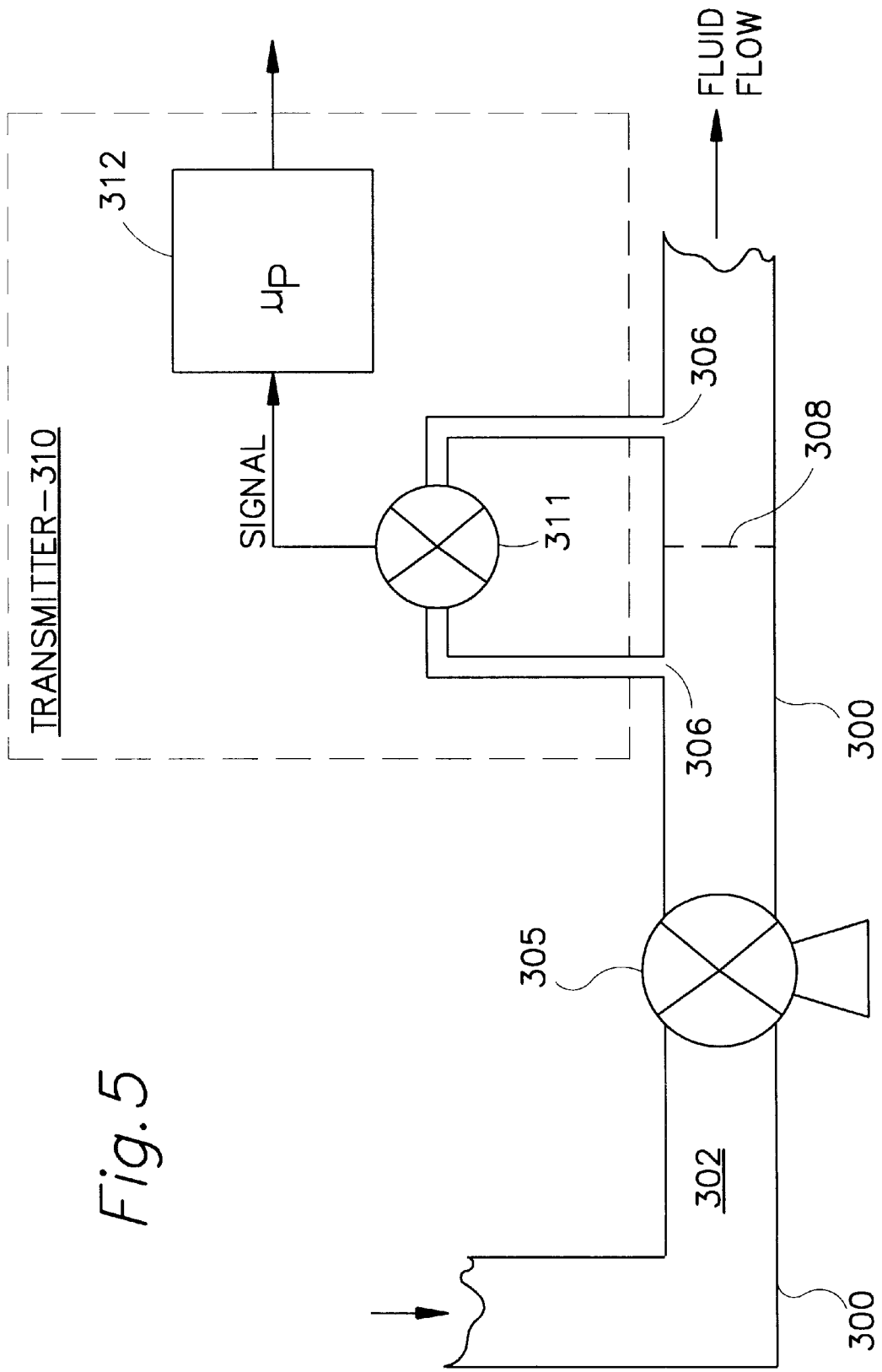
FIG. 5 shows a partial, representative plant facility of the preferred embodiment being controlled by the process control system.

The method of the present invention will now be described. Referring to FIG. 5, there is shown a partial, representative plant facility being controlled by the process control system. The plant facility oftentimes includes a network of pipelines having fluid flowing therein. In order to move the fluid, pumps are placed in the pipeline network. Valves (not shown) which are closed or fully/partially opened in response to command signals from the process control system are also included in the pipeline network. The pipeline network, which is usually unmanned, includes a pipeline 300 having a fluid 302, and a device for measuring temperature, pressure or differential pressure, fluid flow, . . . . The devices (often referred to as field devices herein) are generally mounted on the pipeline and generally required at least one pipe intrusion 306. In the preferred embodiment of the present invention a transmitter 310 is mounted on the pipeline 300 and measures the pressure within the pipeline by measuring a differential pressure on either side of an orifice plate 308. (As will be recognized by those skilled in the art, a pressure device measuring absolute pressure does not require the orifice plate 308 but still requires at least one pipe intrusion.) The pump, pump connections, pipe intrusions, orifice plate connections, . . . can be the source of the malfunctions, leaks, . . . .

Transmitters 310 generally include a sensor/sensor assembly 311 which outputs a "raw" signal which is then coupled to a microprocessor (μp) device 312 for amplification, compensation, scaling, and the like. The output of the transmitter 312 (which is essentially the output of the μp 312, any desired digital to analog conversion, . . . not being shown here) is coupled to the IOP 21 of the process control system 10 for performing the control function. A more detailed description of the transmitter may be had by referring to U.S. Pat. No. 4,567,466, assigned to the assignee of the present application.

Typically, the sensor element 311 functions as a pressure transducer, converting displacement caused by pressure exerted thereon to an electrical output signal. The sensor element includes a semi-conductor plate or diaphragm having strain-sensitive elements, e.g., piezoresistive, diffused thereon. The sensor element of the present invention utilizes a sensor of RIMS (Resonant Integrated Microsensor) technology, which has a higher band width and a higher frequency response than present day silicon sensors. As a result, a much better output of the noise signal is achieved. The RIMS technology is well understood by those skilled in the art. More detailed information about the resonant sensors can be had by reference to U.S. Pat. No. 5,275,055, assigned to the assignee of the present application.

Figure 6:
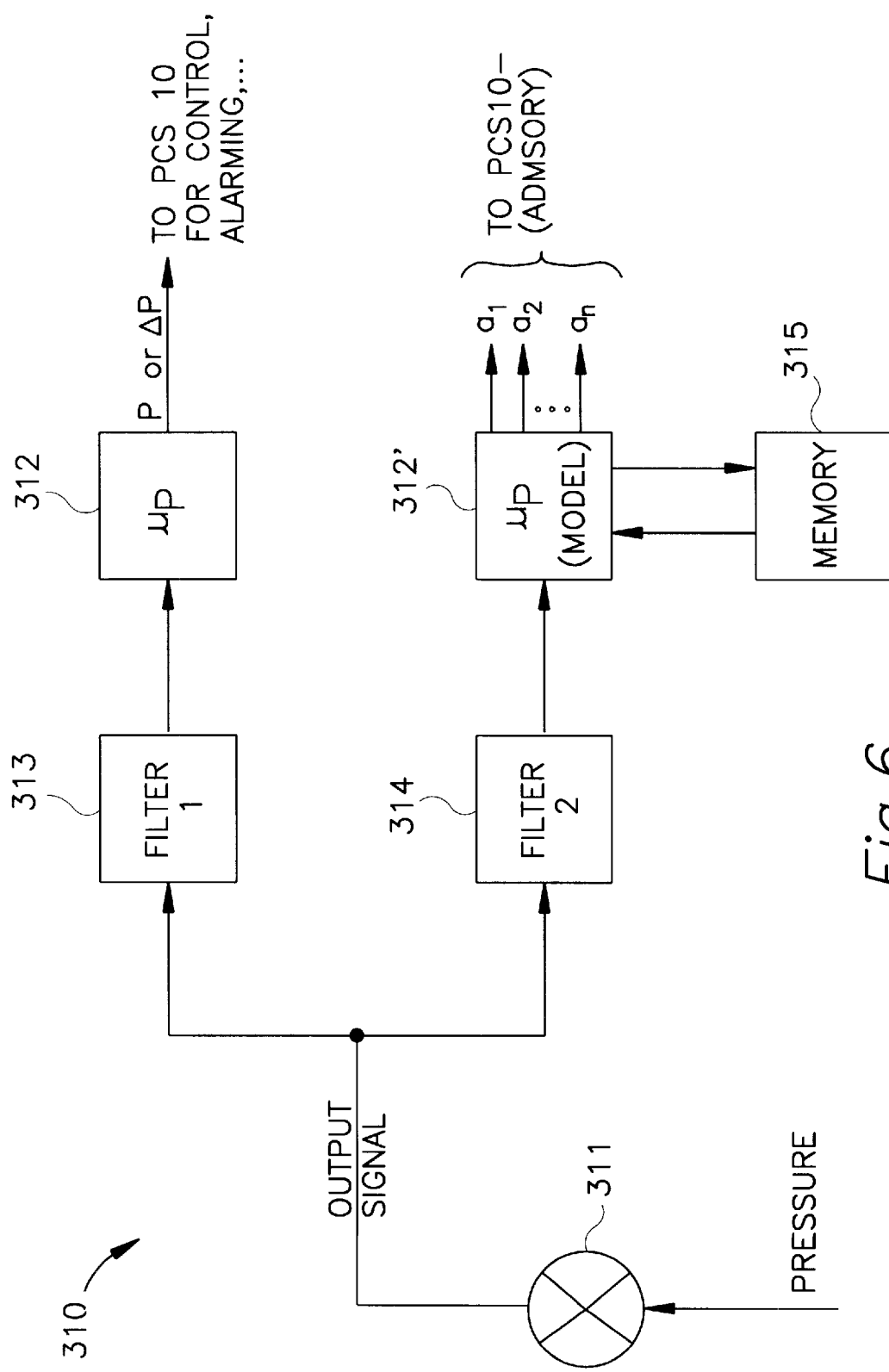
FIG. 6 shows a functional block diagram of the preferred embodiment of a transmitter of the present invention.

Referring to FIG. 6, there is shown a functional block diagram of the transmitter 310 of the present invention. The transmitter 310 of the present invention includes a sensor element 311 of the RIMS technology measuring a pressure from a pipeline (or other element). The sensor element 311 outputs a signal of a sufficient band width which includes the information signal indicative of the pressure (or delta pressure) which is inputted to a first filter, filter 1 313. The output signal, which also includes noise information of the fluid flow in the pipeline, is inputted into a second filter, filter 2 314. The first filter 313 is a high pass filter to permit the information signal to pass into a microprocessor 312, where the signal is amplified, compensated, scaled, . . . as in a normal sensor which exists today. The second filter 314 is a low-pass filter, which passes the low frequency components of the output signal containing information about the noise inherent in the fluid flow of the pipeline 300. The noise component is inputted to a microprocessor 312' which contains a model of the devices and pipeline network in which the fluid is flowing. As a result of the modeling and an analysis of the noise signal through the modeling, various parameters $A_1, A_2 \ldots A_n$ are outputted to the process control system 10. These output parameters are predictive or preventative maintenance information which are advisory and uncontrolled information. The microprocessor 312' is coupled to a memory 315 which stores the parameter information, both past and current. A comparison of the past and present parameters provides information about changes in the noise signal characteristics of the fluid flow and as a result can reliably detect and predict when a pump seal is beginning to leak, that a pipeline has a small leak (generally at a seal), if the pump 305 is starting to cavitate, bearing noise in the pump indicating a pump failure is imminent, . . . . It will be recognized by those skilled in the modeling arts that a model can be generated to model the fluid flow in the pipeline and the noise associated therewith. The parameters $A_n$ outputted from the model are advisory and in the present invention are coupled to the process control system 10 so that an operator can take appropriate action. The microprocessor 312 and 312' as shown in FIG. 6 can be the same microprocessor 312 as shown in the transmitter of FIG. 5. The filters 313, 314 can include an analog to digital converter and/or can be a digital filter included in the microprocessor 312.

Figure 7:
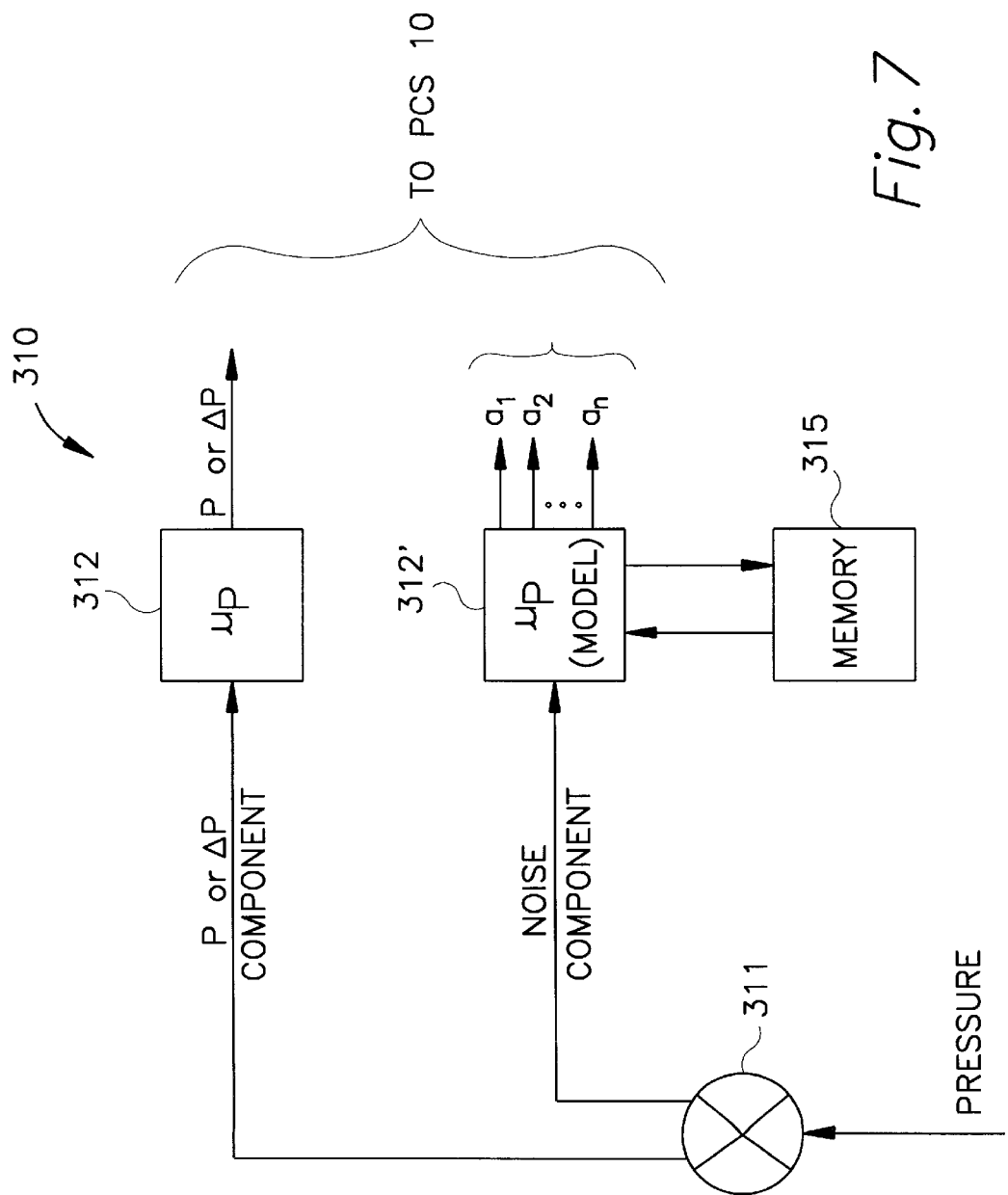
FIG. 7 shows an alternative embodiment of the transmitter of FIG. 6.

Referring to FIG. 7, there is shown an alternative embodiment of the transmitter 310 of FIG. 6. In the alternative embodiment, a sensor element 311 is utilized which has an inherent filter such that two signals are outputted from the sensor element 311. The first signal comprising the pressure or delta pressure component of the output signal of the sensor element 311 and the second signal including the low frequency noise component of the information contained in the output signal thereby eliminating the need for the filters as shown in FIG. 6.

Figure 8:
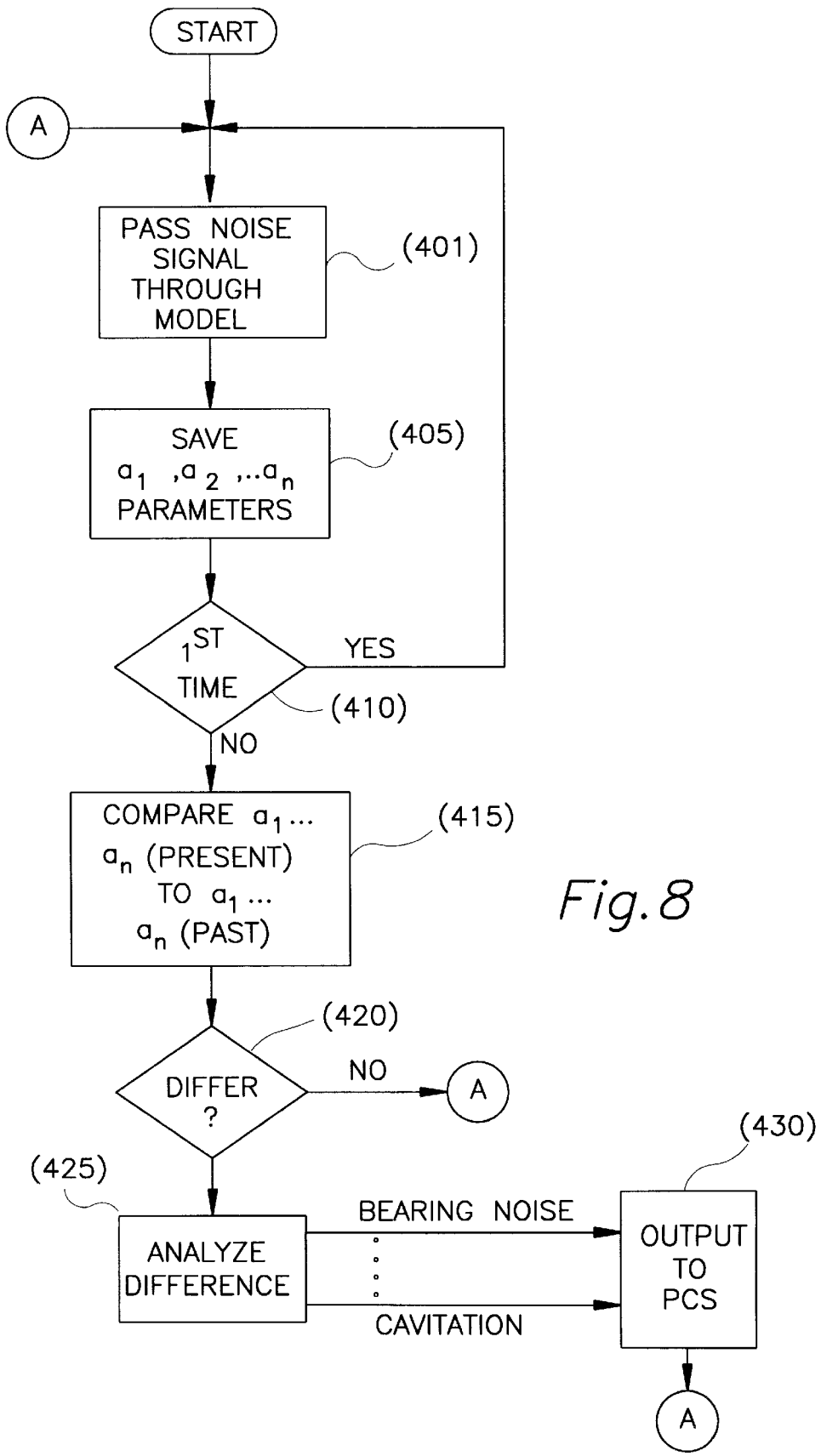
FIG. 8 shows a flow diagram of a method used by the transmitter of the present invention for the early detection of pending equipment failures or a pending faulty condition.

Referring to FIG. 8, there is shown a flow diagram of a method used by the transmitter of the process control system of the present invention for the early detection of pending equipment failure or a pending fault condition. The noise signal is inputted to the microprocessor 312' and is passed through the model contained in the microprocessor (block 401). The output of the model are various parameters indicative of the noise flow within the pipeline, the parameters $A_1, A_2 \ldots A_n$ being saved in the memory 315 (block 405). If this is the first time through the algorithm, effectively what has been done is the parameters are stored and the flow through the pipeline, including the noise component, has been characterized by the model, and the process starts over at block 401. In the normal running of the model (not the first time through), the parameters $A_1$ through $A_n$ recently obtained are compared to the parameters $A_1$ through $A_n$ which have been stored in the memory 315 (block 405). If the parameters are not different, the process is repeated and starts again at block 401. If the currently obtained parameters fail to compare with the past parameters, the difference in the parameters is analyzed (block 425). The parameters may indicate more low-frequency components of the noise, more high-frequency components of the noise, both, . . . whereupon a conclusion can be reached relating the differences to impending failures, such as a bearing noise which has gotten louder, or cavitation noise has been detected, and these can be related to the equipment/devices causing the noise; and as a result a specific output (or outputs) is made to the process control system (block 430), indicating the potential or probable equipment failure in the pipeline system.

While there has been shown what is considered the preferred embodiment of the present invention, it will be manifest that many changes and modification can be made therein without departing from the essential spirit and scope of the invention. It is intended, therefore, in the annexed claims to cover all such changes and modifications which fall within the true scope of the invention.

I claim:

1. In a pipeline system of a process facility, the pipeline system having a plurality of equipments, the equipments including at least one pipeline for providing a channel for a fluid of a process to flow, the process of the process facility being controlled by a process control system, and at least one device for measuring a process variable of the fluid, the device comprising:

a) sensor element for sensing the process variable of the fluid flowing in the pipeline arranged to output a signal containing information about the process variable being measured and containing information about the fluid flowing in the pipeline;
   b) first high pass filter to pass an information component of the signal containing the information of the process variable being measured;
   c) second low pass filter to pass a noise component of the signal containing the information about the fluid flowing in the pipeline;
   d) first processor for processing the information component of the signal to output the process variable to the process control system to control the process; and
   e) second processor for processing the noise component of the signal in a flow model of the pipeline system to output advisory information indicating imminent failure of the equipment when detected by said processing of the noise component by the second processor.

2. A device according to claim 1 wherein said sensor element has a broad bandwidth.

3. A device according to claim 2 wherein said sensor element is an element of resonant integrated microsensor technology.

4. A device according to claim 3 wherein said first processor and said second processor is a microprocessor performing the processing of the information component of the signal and the component of the signal.

5. In a pipeline system of a process facility, the pipeline system having a plurality of equipments, the equipments including at least one pipeline for providing a channel for a fluid of a process to flow, the process of the process facility being controlled by a process control system, and at least one device for measuring a process variable of the fluid, the device comprising:

a) sensor element for sensing the process variable being measured and containing information about the fluid flowing in the pipeline, said sensor element arranged to process said process variable being measured and to output an information signal containing information about the process variable being measured and a noise signal containing information about the fluid flowing in the pipeline;
   b) first processor for processing the information signal to output the process variable to the process control system to control the process; and
   c) second processor for processing the noise signal in a flow model of the pipeline system to output advisory information indicating imminent failure of the equipment when detected by said processing of the noise component by the second processor.

6. In a pipeline system of a process facility, the pipeline system having a plurality of equipments, the equipments including at least one pipeline for providing a channel for a fluid of a process to flow, the process of the process facility being controlled by a process control system, and at least one device for measuring a process variable of the fluid, a method for predicting imminent failures of the equipments of the pipeline system, the method comprising the steps of:

a) capturing a signal by the device, the signal having an information component and a noise component, the information component including information about the process variable of the fluid being measured by the device, and the noise component including information about the flow of the fluid;
   b) passing the noise component of the signal through a model of the pipeline system to characterize the noise component of the signal by characterization parameters;
   c) if this is the first pass through the method,
      i) saving these initial characterization parameters; and
      ii) proceeding to step (a); otherwise
   d) comparing the characterization parameters of the current pass with the initial characterization parameters;
   e) analyzing differences in the characterization parameters to indicate the cause of the differences, the causes being indicative of an imminent failure of an equipment of the pipeline system; and
   f) transmitting information to the process control system of the imminent failure of the pipeline system in order that corrective action can be taken timely.

\* \* \* \* \*